US005093065A

United States Patent [19]

Creedon

[11] Patent Number: 5,093,065

[45] Date of Patent: Mar. 3, 1992

[54] PRESTRESSING TECHNIQUES AND ARRANGEMENTS

[75] Inventor: Richard L. Creedon, San Diego, Calif.

[73] Assignee: General Atomics, San Diego, Calif.

[21] Appl. No.: 57,372

[22] Filed: Jun. 2, 1987

[51] Int. Cl.⁵ ........................ B28B 1/00; B29C 61/02; B29C 61/04; B29C 61/06

[52] U.S. Cl. .................................... 264/228; 264/229; 264/230; 264/231

[58] Field of Search ............... 264/228, 229, 230, 231, 264/333, 261, 265

[56] References Cited

U.S. PATENT DOCUMENTS

| | | | |
|---|---|---|---|
| 2,414,011 | 1/1947 | Billner | 72/50 |
| 2,667,068 | 1/1954 | Viehe et al. | 73/88 |
| 3,167,882 | 2/1965 | Abbott | 264/228 X |
| 3,297,819 | 1/1967 | Wetmore | 264/230 X |
| 3,676,968 | 7/1972 | Campbell | 264/228 X |
| 3,786,806 | 1/1974 | Johnson et al. | 128/92 |
| 3,960,995 | 6/1976 | Kourkene | 264/27 |
| 4,233,690 | 11/1980 | Akins | 3/1.5 |
| 4,267,139 | 5/1981 | Scheibe et al. | 264/229 |

FOREIGN PATENT DOCUMENTS 338864 12/1924 United Kingdom .

OTHER PUBLICATIONS

Schetky, L. McDonald, "Shape Memory Alloys", *Scientific American,* 241:5, pp. 74–82 (1979).

Schetky, L. McDonald, "Shape Memory Effect Alloys For Robotic Devices", *Robotics Age,* pp. 13–17, Jul. 1984.

"Memrytec TM Designs and Products", Memory Metals, Inc. Publication.

*Primary Examiner*—Karen D. Kutach Aftergut
*Attorney, Agent, or Firm*—Fitch, Even, Tabin & Flannery

[57] ABSTRACT

A prestressing arrangement and technique for the manufacture of prestressed bodies or structures includes shape memory material members. According to one aspect of the invention, the prestressing arrangement includes a tensile member in series with a shape memory material member. The formable material is shaped around the members and fixed in form. The shape memory material is then shrunk by heating it above its characteristic threshold temperature, placing the members in tension and the fixed material in compression. According to another aspect, the shape memory material member is secured in a tube. Prestressing is achieved in the tubular prestressing arrangement by lengthwise expansion of the shape memory material member prior to fixing the material of the body being formed, and then after fixation, releasing the stress on the shape memory material member, leaving the tube in tension to exert compressive forces on the fixed material.

5 Claims, 1 Drawing Sheet

PRESTRESSING TECHNIQUES AND ARRANGEMENTS

This invention is directed toward making prestressed bodies or structures of selected size and shape, and particularly toward prestressing such bodies or structures of particular shape using a prestressing arrangement which includes shape memory materials.

BACKGROUND OF THE INVENTION

Many techniques and arrangements for making prestressed bodies of formable materials such as concrete, plaster or ceramics, for example, are known today, yet none of them is capable of effective implementation without considerable difficulty in construction. Unless the bodies are correctly prestressed, they will be subject to considerable internal stresses and cracking.

One well-known technique for manufacturing bodies and structures incorporates a prestressing arrangement within the bodies themselves. According to this technique, prestressing tendons are temporarily anchored in place and pulled tight within a body being formed before fixing or hardening the formable material over the prestressing tendons. Once the formable material hardens, the prestressing tendons are released from their anchors. The resulting tensile forces in the prestressing tendons establish compressive forces in the body, preloading the body against tensile forces.

It is, however, often difficult to prestress the tendons tightly enough. This is particularly the case in constructing complex bodies or structures, because the tendons of the arrangement cannot be pulled taut except in straight lines. Accordingly, conventional techniques are generally limited to use in the manufacture of elongated or prismatic bodies or structures.

Attempts have been made to solve this problem by heating the tendons and anchoring the hot tendons in a hardened body, then allowing the tendons to cool and contract to prestress the body. However, this technique has its limitations and is unsatisfactory for many reasons. In particular, the large amount of heat required to prestress the tendons adequately in large bodies makes the technique highly impracticable in many instances. U.S. Pat. No. 2,414,011, issued to K. P. Billner in 1942, illustrates this technique and shows some of the shortcomings and difficulties involved in prior techniques.

It is well known that certain structural materials known as shape memory materials change in form, shape and length not only due to usual thermal expansion and contraction, but also according to so-called shape memory effects. Such materials in effect "remember" a certain original shape they held at a prior time, and when subjected to heating above a particular threshold or transformation temperature level, they return to this original shape. In certain metallic alloys, this shape memory effect manifests itself in a diffusionless, solid-state transformation, which is known as martensitic phase transformation. Nickel-titanium and certain copper-based alloys are examples of materials which can undergo martensitic transformation.

When such alloys are subject to a well-known thermomechanical process, the martensitic phase structure is produced. The structure may be deformed substantially from its original shape. However, it promptly changes back to its original shape, when its temperature is increased beyond a particular material-characteristic temperature threshold level or point. This threshold level is frequently referred to as the transition temperature. Upon reaching this temperature, the martensitic metal structure "remembers" its original shape and tends to return thereto.

As is well known, the memory effects of martensitic alloys have been commercially used in several applications, including use in tube couplings. According to this particular commercial application, the "original" shape of the tube coupling has a diameter which matches the dimensions of a pair of adjacent tube ends to be joined together. The tube coupling element is then deformed by a well-known process to a larger diameter, which permits the coupling to be slipped over the tube ends to be joined. After being slipped over the tube ends, the coupling is heated beyond its threshold temperature, and it consequently returns toward its original smaller diameter. A very strong bond is thus produced between the tube ends joined by operation of the shape memory effect.

The change in size produced in the shape memory material as a result of transformation can be substantial. For example, certain known alloys of nickel-titanium will reduce in size by as much as 8%. Material bodies made of a particular brass alloy are known to reduce in size up to 4%. As is also well known, a substantial number of shape memory alloys are commercially available which have transition temperatures ranging from 20° C. to 150° C.

SUMMARY OF THE INVENTION

It is an aspect of the invention herein to take advantage of the properties of shape memory materials, such as for example martensitic alloys, in the construction of plastic, concrete or ceramic bodies and structures. In particular, the properties of shape memory materials are applied in the construction of complex bodies or structures made of prestressed concrete.

The invention herein is directed to prestressing bodies and structures with shape memory material elements in tendon arrangements or assemblies which change in axial, circumferential or longitudinal length or extension upon being heated beyond a particular threshold, transition or transformation temperature, to try to reestablish their original shape or form. The tendon assembly is supported within a suitable support structure, and then concrete, plaster, ceramic or another hardenable or formable encasing material is formed over the assembly. The formable material of the body or structure is then hardened or fixed. Prestressing the tendon assembly includes heating the shape memory portion of the assembly to a temperature above its transition temperature, whereby the shape memory portion of the assembly tends to revert to its original form and subjects the body in which the assembly is held to substantial, desired internal compressive forces.

According to one embodiment of the invention, a prestressed body of predetermined size and shape is manufactured by utilizing one or more elongated members formed of shape memory material that shrink when heated above their characteristic threshold temperature. Such element or elements are connected in series with one or more selected axially or longitudinally elongated tensile members to establish a prestressing tendon for spanning at least a selected portion of the body being manufactured. The tendon is encased in a selected formable material such as concrete, plastic or ceramic. The formable material is hardened or fixed, and the material is heated beyond its characteristic threshold temperature to "remind" it of its original length, causing the prestressing element to shrink toward that length, whereby the encasing material is subject to desired internal compression.

Further, according to another embodiment, shape memory material that elongates when heated above its threshold temperature is in the form of an elongated rod. The memory element is surrounded by an axially or longitudinally stretchable, metallic tube. A filler element can be placed in the tube in series with the memory element, and the ends of the tube can be closed to secure the memory element within the tube. The shape memory material can then be heated, placing the inner memory element and filler element in compression and the tube in tension. When used to place a formed body in compression, one end of the tube can be left exposed and extending out of the body. After the body is formed and hardened, the stress on the rod can then be relieved, leaving the tube in tension to apply compressive forces on the body.

Further, according to another preferred embodiment of the invention, at least a single elongated tendon is disposed for axial extension between first and second tendon end points. The tendon includes at least one elongated shape memory member and a tensile member with a connector for serially joining the tensile and memory members.

Further according to the invention, a prestressed body is made by disposing at least one elongated tendon in a predetermined position. This tendon is formed at least in part of shape memory material that tends to revert to a remembered shape when heated above a characteristic threshold temperature. The formable material is formed into a desired shape about the tendon, and the formable material is hardened in the desired shape with at least portions of the tendon secured to the hardened material. The tendon is then placed in tension at least between the positions secured to the hardened materials to prestress the hardened material in compression. The placing of the tendon in tension includes heating the shape memory material above the threshold temperature.

According to one aspect of the invention, the shape memory material shrinks when heated above the threshold temperature. Pursuant to this aspect, the tendon can be formed of shape memory material serially connected to a tensile member.

According to another aspect of the invention, the shape memory material elongates when heated above the threshold temperature. The tendon is formed of shape memory material confined by a tensile member. The shape memory material is heated above the threshold temperature to place the shape memory material in compression and the tensile member in tension prior to the hardening of the formable material. Placing the tendon in tension includes relieving the stress on the shape memory material after the hardening of the formable material. This leaves the tensile member in tension to prestress the hardened material in compression.

DETAILED DESCRIPTION OF A PREFERRED EMBODIMENT OR BEST MODE FOR CARRYING OUT THE INVENTION

Figure 1:
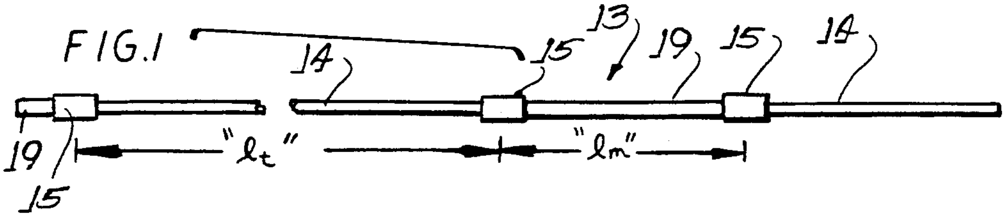
FIG. 1 is a plan view of a serial or chain-type prestressing tendon according to the invention.

FIG. 1 shows a preferred embodiment of a chain-type, serial prestressing tendon 13 according to the present invention. The tendon 13 includes conventional tensile members 14, made out of steel, for example. Further, the tendon 13 includes joining elements 15, preferably in the form of cylindrical sleeves. These elements 15 are, for example, swaged or otherwise joined to combine the ends of the conventional tensile members 14 with shape memory members 19 to form the single elongated tendon 13. As shown in FIG. 1, the tensile members 14 are alternately linked end-on-end, i.e. in series, with the memory members 19 in a continuous chain, only a portion of which is actually shown.

The shape memory member 19 may be formed of a suitable selected copper-base or nickel titanium alloy which changes in length, for example, up to 5%, resulting in stresses as high as 45,000 pounds per square inch, when the memory material is heated beyond its characteristic threshold temperature of about 160° F. Depending upon relative cross section, this may correspond to stresses up to 180,000 pounds per square inch in the tensile members 14.

The shape memory materials and alloys needed according to the invention herein are available from Memory Metals, Inc. of Stamford, Conn., and are described by L. McDonald Schetky in "Shape-Memory Alloys", *Scientific American,* Vol. 241, No. 5, pp. 74–82 (Nov. 1979) and in "Shape Memory Effect Alloys for Robotic Devices", *Robotics Age,* July 1984, pp. 13–17. Such materials purchased from Memory Materials, Inc. can be specified to expand or shrink in length.

According to the invention, it is important to control the amount of axial, circumferential or longitudinal change in length actually produced. The invention herein thus includes a tendon 13 which includes an axially elongated member of memory material 19 linked to a long, conventional tensile member 14 which may be of steel material. In particular, according to one embodiment of the invention, the ratio of the length "$l_m$" of the memory member 19 to the length "$l_t$" of the conventional tensile member, as shown in FIG. 1, may be on the order of one to ten. With respect to the embodiment shown in FIGS. 2A–2C, similar ratios of the length of the memory member 19 to the length of the filler member 20 are preferred.

The memory material in the memory member 19 is made according to well-known thermomechanical processes to be either stretched or compressed from its original length yet able to return axially to its original length upon passing above its characteristic threshold temperature. This shape memory material is conveniently available from any one of a number of manufacturers, including, for example, Memory Materials, Inc., as suggested above.

Figure 2A:
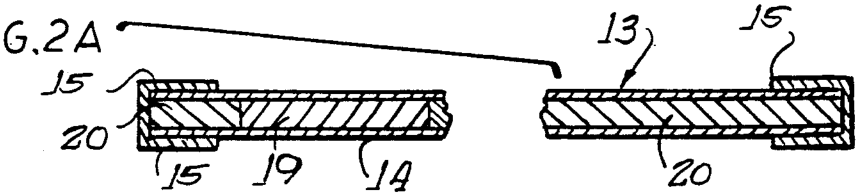
FIGS. 2A and 2B are fragmentary axial cross-sectional views of a tube-type prestressing tendon according to the invention herein, shown respectively before and after being reminded of its original length by having its memory element pass beyond its characteristic transition temperature.
Figure 2B:
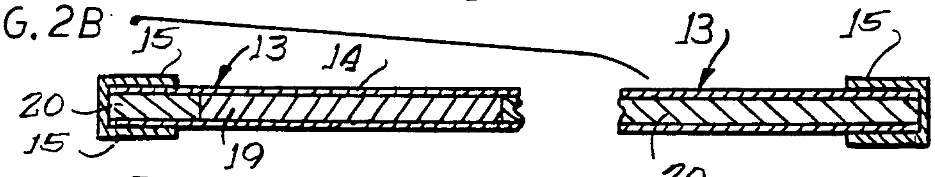
Figure 2C:
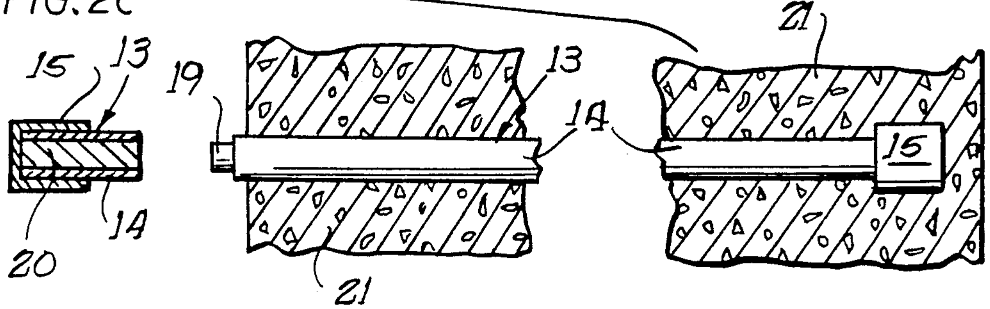
FIG. 2C is a plan view of the tendon shown in FIGS. 2A and 2B secured in a formed body and after having a portion of its end cut off to relieve the compression on the inner rod, leaving the tube to exert compressive force within the body, the body being shown in fragmentary section and the cut-off end being shown in section.

In the serial or chain-type embodiment of the invention as shown in FIG. 1, the memory member 19 contracts or shrinks when it returns to original length. In the embodiment of FIGS. 2A–2C, it expands longitudinally. FIG. 2A shows a portion of the tubular prestressing tendon 13 in axial cross-section prior to transition toward a longer original shape. In particular, the memory member 19 is shown in FIG. 2A fitted into a tensile member 14. As can be seen, cylindrical joining elements 15 in the form of caps securely hold the memory member 19 and the selected filler member 20 securely in the tensile member tube 14. One typical material for the filler member 20 is common steel.

According to this particular version of the invention upon energization and heating of the memory member 19 above the characteristic threshold temperature, the material elongates to the extent permitted by the tube 14, as shown in FIG. 2B. A suitable memory effect material for this purpose includes a material such as CoZnAl or brass. A formable material is then disposed in a desired shape around the tendon 13 and fixed.

FIG. 2C shows the final stage of manufacture of the formable body built with an internal prestressing tendon 13. It shows the concrete 21 already poured in place and hardened about the tensile member tube 14. A portion of the tube 14 and one of the joining elements 15 extending outside the concrete material 21 has been cut off and removed. Accordingly, the compressive stress on the memory member 19 is relieved and the memory member 19 extends itself out of its encircling tube 14, leaving the tube 14 in tension, secured to the concrete 21 and prestressing the concrete in compression. The memory member 19 can be removed and recycled according to conventional techniques. Additionally, the filler material 20 can be removed and reused. The tube 14 may be suitably lubricated in its midsection so that the tensile force established by the tube operates within the concrete 21 to keep it in compression.

When a tendon of the sort shown in FIG. 1 is used in a body formed therearound, the particular shape memory material chosen has a transition temperature below that which would destroy or damage concrete or whatever formable material is selected for use in the body under construction. Heating of the memory material or element used in the prestressing arrangement can, for example, be accomplished by immersing the entire structure being formed in steam heat, according to well-known techniques. In lieu thereof, the prestressing arrangement can be heated electrically by using an electric means (not shown) attached to the electrically conductive structure of the tendon 13 itself.

Figure 3:
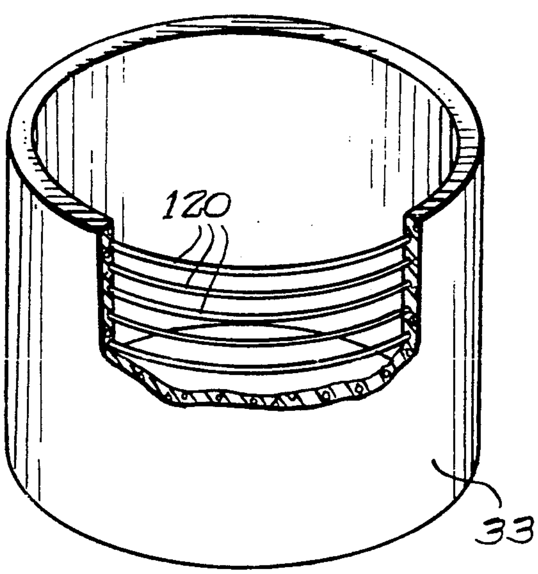
FIG. 3 is a partial cutaway perspective view of a complex concrete structure having walls which are prestressed according to the invention herein.
Figure 4:
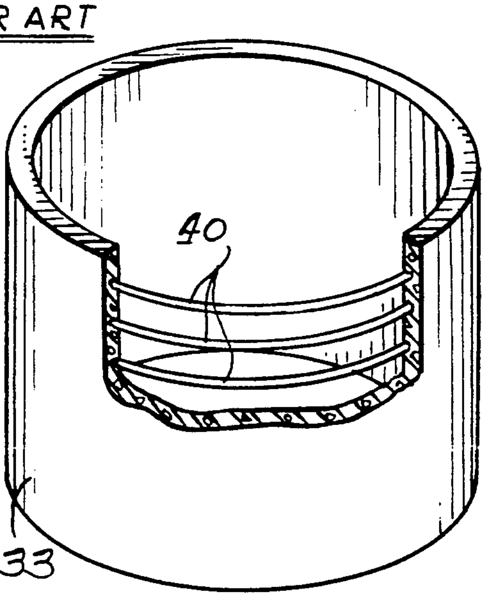
FIG.4 PRIOR ART
FIG. 4 is a partial cutaway perspective view of a conventional steel reinforced concrete structure of the prior art.

FIG. 3 illustrates the construction of a complex prestressed concrete structure 33, using a prestressing arrangement 120 according to the invention herein. Additionally, FIG. 4 shows a prior art reinforced concrete tank reinforced with conventional rebar elements 40. In both cases, an internally circumferential arrangement is employed. However, the prior art version in FIG. 4 does not enjoy the advantages of prestressed reinforcement.

Variations of the embodiments of the invention herein can be made without departing from the spirit and scope of the invention.

What is claimed is:

1. A method of manufacturing a prestressed body comprising disposing at least one elongated tendon in a predetermined position, said tendon including shape memory material that shrinks when heated above a characteristic threshold temperature, forming formable material into a desired shape about said tendon, hardening the formable material in said desired shape with at least portions of said tendon secured to said hardened material, and after said formable material is hardened placing said tendon in tension at least between said portions secured to said hardened material to prestress said hardened material in compression, said placing tendon in tension including shrinking the shape memory material by heating said shape memory material above said threshold temperature.

2. A method according to claim 1 wherein said tendon comprises first and second elongated members connected in series, said first member being formed of said shape memory material, and said second member being a tensile member.

3. A method of manufacturing a prestressed body comprising disposing at least one elongated tendon in a predetermined position, said tendon including first and second members connected together with said second member confining said first member, said first member being formed of shape memory material, said second member being a tensile member, and said shape memory material tending to elongate said first member when heated above a characteristic threshold temperature; forming formable material into a desired shape about said tendon; hardening said formable material in said desired shape with at least portions of said tendon secured to said hardened material; heating said shape memory material above said threshold temperature to place said first member in compression and said second member in tension prior to said hardening of said formable material; and relieving the compressive stress on said first member after said hardening of said formable material, leaving said second member in tension to prestress said hardened material in compression.

4. A method according to claim 3 wherein a filler member is placed in series with said first member and is confined by said second member.

5. A method according to claim 3 wherein said memory material is removed through one end of said second member after said formable material is fixed.

* * * * *